UNITED STATES PATENT OFFICE.

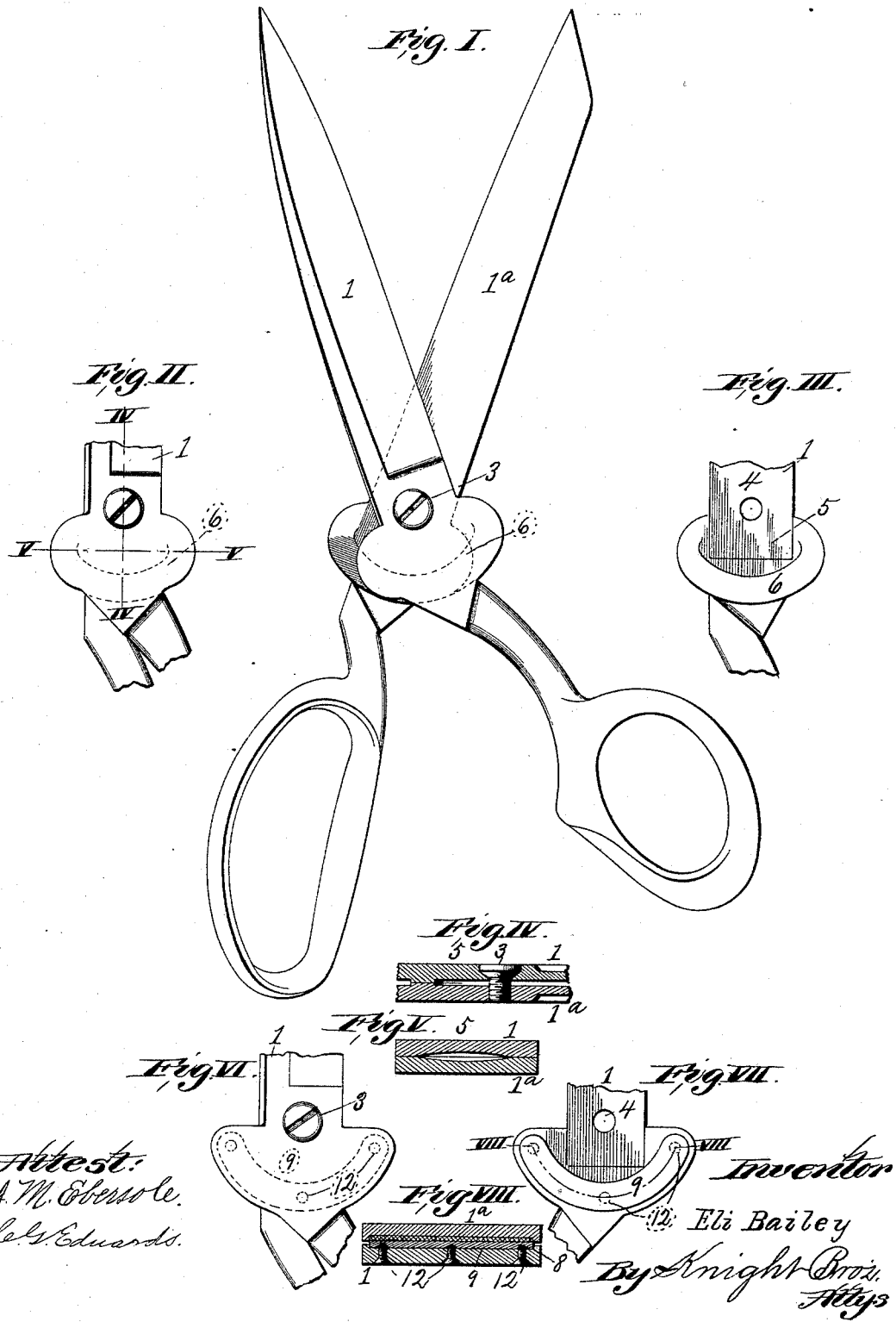

ELI BAILEY, OF ST. LOUIS, MISSOURI, ASSIGNOR OF TWO-THIRDS TO SARAH BAILEY, OF SAME PLACE.

SHEARS.

SPECIFICATION forming part of Letters Patent No. 524,673, dated August 14, 1894.

Application filed March 24, 1894. Serial No. 505,032. (No model.)

*To all whom it may concern:*

Be it known that I, ELI BAILEY, of the city of St. Louis, in the State of Missouri, have invented a certain new and useful Improvement in Shears or Scissors, of which the following is a full, clear, and exact description, reference being had to the accompanying drawings, forming part of this specification.

My invention relates to certain improvements in scissors or shears, and consists in providing the blades with enlarged bearing surfaces back of the pivot, so that the blades will have bearing upon each other when open, as well as when in their closed position, and prevented from rocking upon each other.

Figure I is a perspective view, illustrative of my invention. Fig. II is a detail, side view of the shears in closed position. Fig. III is a detail, inner view of one of the blades. Fig. IV is a detail, longitudinal section, taken on line IV—IV, Fig. II. Fig. V is a transverse section, taken on line V—V, Fig. II. Figs. VI and VII are modified forms of the construction. Fig. VIII is a transverse section, taken on line VIII—VIII, Fig. VII.

Referring to the drawings, 1 and 1ª represent the two blades of the shears or scissors, which are pivoted together in the usual way by means of a screw or rivet 3 passed through an eye 4.

5 represents a cavity in each blade directly back of the eye, and back of each cavity and partially encircling the cavity there is formed a semi-circular bearing 6, the bearing of one blade riding upon the bearing of the other, throughout the movement of the opening and closing of the blades, which causes the scissors or shears to work perfectly, inasmuch as the cutting edges are evenly pressed and guided together throughout the entire cut.

In Figs. VI, VII and VIII, I have shown a modification, where the bearing surfaces are made by means of semi-circular strips 9 set into grooves 8 formed in the blades back of the cavities, the strips being held by means of screws 12 passed through one of the blades. By moving the screws slightly, the strips 9 may be adjusted to or from each other, to compensate for wear, either on the blades themselves or on the pivot, thus keeping the blades adjusted so as to cut properly.

I claim as my invention—

A pair of shears or scissors comprising blades having level bearing faces and depressions or cavities located at the back of the pivot only and extended, raised bearing surfaces located on both blades at the back of the pivot only and partly encircling the depressions or cavities; substantially as described.

ELI BAILEY.

In presence of—
  A. M. EBERSOLE,
  C. G. EDWARDS.